United States Patent [19]

Kobori et al.

[11] 4,289,392
[45] Sep. 15, 1981

[54] PENTAGONAL ROOF REFLECTING MIRROR ASSEMBLY

[75] Inventors: Toshio Kobori, Sakai; Yasuo Yamazaki; Isamu Uchida, both of Kawachinagano, all of Japan

[73] Assignee: Minolta Camera Kabushiki Kaisha, Osaka, Japan

[21] Appl. No.: 115,182

[22] Filed: Jan. 25, 1980

[30] Foreign Application Priority Data

Feb. 1, 1979 [JP] Japan .................... 54-12619[U]

[51] Int. Cl.³ .................... G03B 13/08; G02B 1/00
[52] U.S. Cl. .................... 354/225; 350/61
[58] Field of Search ............ 354/152, 155, 199–201, 354/219, 225, 224; 350/61, 63, 64

[56] References Cited

U.S. PATENT DOCUMENTS

| | | | |
|---|---|---|---|
| 624,517 | 5/1899 | Mercer | 354/225 |
| 693,077 | 2/1902 | Staff | 350/61 |
| 1,716,321 | 6/1929 | Pearson | 350/63 X |
| 2,165,512 | 7/1939 | Schofield | 354/225 |
| 2,465,764 | 3/1949 | Underhill | 350/61 |
| 2,508,864 | 5/1950 | Lane | 354/225 |
| 3,101,412 | 8/1963 | Scott-Maxwell | 350/61 |
| 3,603,200 | 9/1971 | Hiruma | 354/225 |
| 3,656,421 | 4/1972 | Ataka | 354/155 |
| 4,128,321 | 12/1978 | Kobori et al. | 354/225 X |
| 4,206,991 | 6/1980 | Kobori et al. | 354/225 |

Primary Examiner—Donald A. Griffin
Attorney, Agent, or Firm—Jackson, Jones & Price

[57] ABSTRACT

A hollow pentagonal roof type reflecting mirror assembly for use in a viewfinder optical system of a single lens reflex camera is dust tight to prevent entry of dust into the inside hollow space and includes a filtered vent aperture to allow passage of vapor so that condensation will not occur inside the assembly. The assembly includes a hollow pentagonal body having roof and front mirrors and at least one vent aperture and a shielding or sealing member arranged to close the vent hole. The shielding or sealing member is made of a dust proof and ventilative material such as a foamed plastic, a paper and a cloth to filter out any dust particles.

10 Claims, 22 Drawing Figures

PENTAGONAL ROOF REFLECTING MIRROR ASSEMBLY

BACKGROUND OF THE INVENTION

1. Field of the Invention

The present invention relates to a pentagonal roof reflecting mirror assembly for use in a viewfinder optical system of a single lens reflex camera and more particularly to a dust free modular unit that is not only capable of preventing the entry of dust and debris into the inside hollow space thereof, but will be free from condensation.

2. Description of the Prior Art

As is generally known, a pentagonal roof type reflecting mirror assembly is made up of a pair of roof reflecting mirrors and a third reflecting mirror to transmit an image of the object scene to a viewer for aiming and focusing the camera. With the advent of more sophisticated 35 millimeter cameras, there has been an additional requirement to make the 35 millimeter camera as compact and lightweight as possible. In this regard, there has been suggestions to utilize a plastic housing structure for the pentagonal roof reflecting mirror assembly. As can be appreciated by a skilled photographer, the pentagonal roof reflecting mirror assembly is removable on more expensive cameras in order to permit an optional changing of the focusing screens to accomodate the particular desired type photography such as astro photography, dim light applications, dioptric and parallax focusing with close ups.

One suggestion to provide a lighter weight and economical plastic pentagonal roof reflecting mirror assembly can be seen in U.S. Pat. No. 3,603,200. Another example can be seen in U.S. Pat. No. 3,618,449 wherein side and rear wall members are provided to both reinforce the roof reflecting mirror and to prevent the introduction of undesirable or stray light. These plastic reflecting mirror assemblies are open at the bottom for coaction with the focusing screen and are subject to the entry of dust through the open bottom portion which will adhere to the mirror and effect the resulting image transmitted to a viewer. The prior art use of solid glass pentaprisms did not suffer this problem due to the internally reflecting facets of the glass prism. Additional prior art exists in the following: Japanese Utility Model publication 47-24420, published on Aug. 2, 1972; Japanese patent publication 47-4095, published on Feb. 4, 1972; Japanese Utility Model publication 47-20836, published on July 12, 1972; Japanese Utility Model publication 47-33315, published on Oct. 7, 1972; Japanese Utility Model publication 47-33317, published on Oct. 7, 1972; Japanese Utility Model publication 49-12602, published on Mar. 28, 1974; and East German Pat. No. 50,419, published on Apr. 20, 1966.

Pentagonal roof type reflecting mirror assemblies which can obviate the above disadvantage have been proposed by copending U.S. Pat. No. 4,206,991 issued on June 10, 1980, entitled "PENTAGONAL ROOF TYPE REFLECTING MIRROR ASSEMBLIES FOR SINGLE LENS REFLEX CAMERAS", assigned to the same assignee.

The following prior art has been cited in the above referenced pending applications: German Pat. No. 1,127,202, French Pat. No. 1,174,231, German Pat. No. 2,448,625, East German Pat. No. 50,419, Great Britain Pat. No. 1,051,433, U.S. Pat. No. 3,218,946, U.S. Pat. No. 3,620,147, U.S. Pat. No. 3,868,711, U.S. Pat. No. 4,063,261, U.S. Pat. No. 3,760,700, U.S. Pat. No. 3,182,576, U.S. Pat. No. 3,952,321, U.S. Pat. No. 3,911,457, U.S. Pat. No. 3,962,710, U.S. Pat. No. 3,387,530, U.S. Pat. No. 3,840,298, and U.S. Pat. No. 4,128,321.

However, another disadvantage has been found in the mirror assemblies disclosed in the copending applications in that vapor within the mirror assemblies can be condensed into dew on the mirror surfaces to thereby dim the image field of the viewfinder when the environmental atmosphere is cooled because the inside hollow space of the mirror assemblies is prevented from communicating with the exterior of the mirror assemblies.

SUMMARY OF THE INVENTION

Accordingly, it is an object of the present invention to provide an improved pentagonal roof type reflecting mirror assembly which is free from condensation of vapor within an inside hollow space as well as free from entry of dust into the inside hollow space.

To achieve this object, a pentagonal roof type reflecting mirror assembly of the present invention is provided with a substantially airtight hollow pentagonal body having at least one vent hole and a permeable shielding or sealing member arranged to close the vent hole. The pentagonal body further has therein a pair of roof reflective mirrors and a front reflective mirror which cooperate to transmit viewfinder light fluxes. The shielding or sealing member is made of a dustproof and ventilative material such as a foamed plastic, a cloth and a paper. The pentagonal body and the shielding or sealing member constitute a dust-tight enclosure to prevent entry of dust into the hollow space of the pentagonal body while permitting release of water vapor.

The above and other objects and features of the present invention will become more apparent from the following description of preferred embodiments of the present invention, taken in connection with the accompanying drawings.

DESCRIPTION OF PREFERRED EMBODIMENTS

The following description is provided to enable any person skilled in the camera industry to make and use the invention and sets forth the best modes contemplated by the inventors in carrying out their invention. Various modifications, however, will remain readily apparent to those skilled in the art, since the generic principles of the present invention have been defined herein specifically to provide for a relatively economical and lightweight pentagonal roof reflecting mirror assembly.

Figure 1:
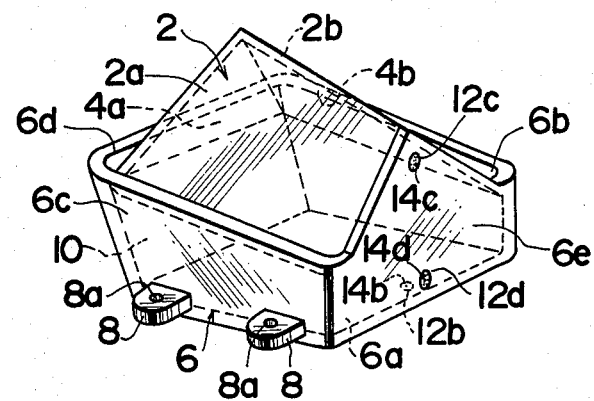
FIG. 1 is a perspective view of a basic embodiment of the present invention disclosing a pentagonal roof reflecting mirror assembly.
Figure 2:
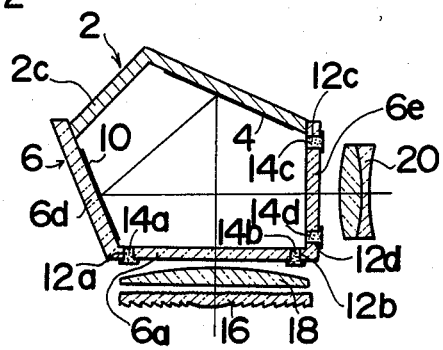
FIG. 2 is a cross-sectional view of the embodiment shown in FIG. 1 in combination with a focusing screen and ocular member.

Referring to FIGS. 1 and 2, a first embodiment of the present invention is disclosed wherein an upper roof portion 2 and lower roof support member 6 constitute the housing of a pentagonal roof reflecting mirror assembly. The upper roof portion 2 is formed as a unitary body of an opaque plastic material and includes roof walls 2a and 2b joined at a right angle with each other along one edge thereof and respectively supporting a pair of roof-shaped reflecting mirrors 4 on the inner wall thereof. Lower roof support member 6 is formed from a transparent plastic material and includes lugs or mounting brackets 8 that are integrally joined to the lower portion. The lower roof support 6 further includes a bottom wall 6a, side walls 6b and 6c, a front wall 6d, and a rear wall 6e. The front wall supports a third reflecting mirror 10 juxtaposed relative to the pair of roof shaped reflecting mirrors to transmit an image in a desired manner. In the front and rear portions of the bottom wall 6a of lower roof support member 6, and in the upper and lower portions of rear wall 6e which are outside of the viewfinder optical path, there are provided vent holes 12a, 12b, 12c and 12d that are filled with a foamed synthetic resin of air permeability, such as a material sold by Bayer A. G. Leverkunsen-Bayerwerk, Germany, and M.T.P. KASEI Co., Ltd., Aichi Prefecture, Japan, under the trademark MOLTOPREN, which is a type of polyurethane resin. This foam material can be seen as elements 14a, 14b, 14c and 14d, respectively, and forms filter means for permitting the passage of air and water vapor while blocking dust particles.

The roof walls 2a and 2b of the roof portion 2 are closely fitted in the side walls 6b and 6c and rear wall 6d of lower roof support 6. The front upper wall 2c of the upper roof portion 2 is also closely fitted into the front wall 6d of lower roof support member 6. This arrangement would provide a virtually airtight and dustfree enclosure but for the provision of the vent holes.

The side lugs or mounting brackets 8 are formed integrally with the lower roof support member 6 and are provided with threaded bores 8a into which appropriate screws can be inserted for attachment to the camera body (not shown).

The viewfinder light, after passing through a focusing plate 16 and a condensing lens 18 can pass through the bottom wall 6a of the lower roof support 6 and then can be reflected on the pair of reflecting mirrors 4a and 4b for transmission through the rear wall 6e of lower roof support 6 to a viewfinder ocular lens 20. The provision of the vent holes and sealing material such as the MOLTOPREN material permits air to pass through to the interior of the mirror assembly and thereby eliminates the problem of trapped condensation or moisture within the housing due to any temperature change. The formation of moisture on the reflecting mirrors would cause a dimming or scattering of light just as the adhesion of dust to the reflecting mirrors 4a, 4b and 10 could cause reduced optical performance.

The following FIGS. 3 through 17 disclose various modifications of the first embodiment disclosed in FIGS. 1 and 2. In each of these embodiments, the upper roof portion 2 and the transparent lower roof support member 6 constitute a closed enclosure similar to that utilized in the first embodiment.

In the embodiments disclosed in FIGS. 3 through 6, a supplemental optical display system for integrating information such as characters inscribed on the diaphragm setting ring or a distance ring 22 from the lens barrel is integrally incorporated into the lower roof support member 6. This information is disclosed schematically as a line, $l_1$, representing an optical path of information display light projected through the pentagonal roof reflecting mirror assembly.

Figure 3:
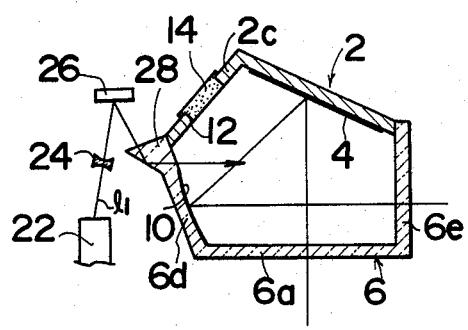
FIGS. 3 to 13 and 15 to 17 are cross-sectional views of various modifications of the embodiment shown in FIGS. 1 and 2.

In the embodiment of FIG. 3, a plug of MOLTOPREN 14 which is opaque is fitted into an aperture 12 provided in the front wall 2c of the upper roof portion 2. The optical system is so arranged that the light from a ring 22 passes through a power adjusting concave lens 24, then is reflected on a plane reflecting mirror 26 onto the prism 28 that is formed integrally with the front wall 6d of the lower roof support 6 to enter the roof reflecting mirror assembly.

Figure 4:
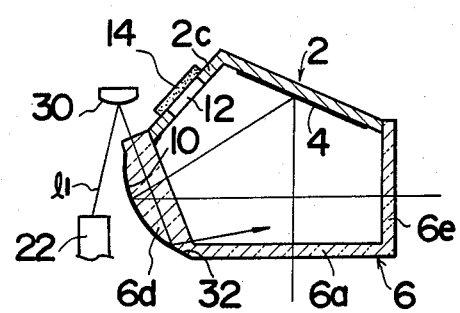

In the embodiment of FIG. 4, a piece of MOLTOPREN 14 is attached to the front wall 2c of the upper roof portion 2 in such a manner to cover an aperture 12 provided in the front wall. In this optical system, the information display light from ring 22 is reflected on a convex mirror 30, then passes through a light guide 6d of the front wall of the lower roof support, and is reflected on a reflecting surface 32 formed in the lower portion of the front wall thereof to enter the roof reflecting mirror assembly.

Figure 5:
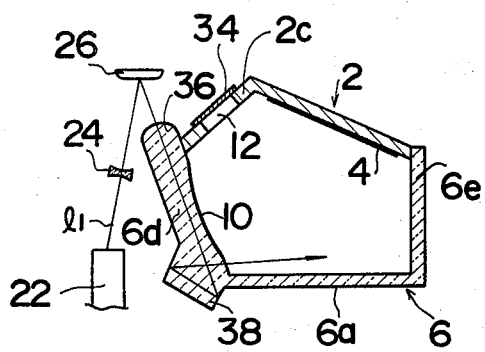

In the embodiment of FIG. 5, a piece of cloth 34 covers an aperture 12 provided in the front wall 2c of upper roof portion 2 and is attached to the peripheral portion of the aperture. In the optical system of this embodiment, the light from ring 22 passes through the concave lens 24, is reflected on reflecting mirror 26, then passes through a concave lens portion 36 and front wall 6d, and is reflected twice on a prism portion 38, to be emitted into the roof reflecting mirror assembly.

In order to provide increased power for the viewfinder optical system, the third reflecting mirrors in each of the embodiments of FIGS. 3 through 5 have the form of a concave mirror. In the embodiment of FIG. 4, the reflecting mirror forms a combination convex mirror lens, in combination with the front wall.

Figure 6:
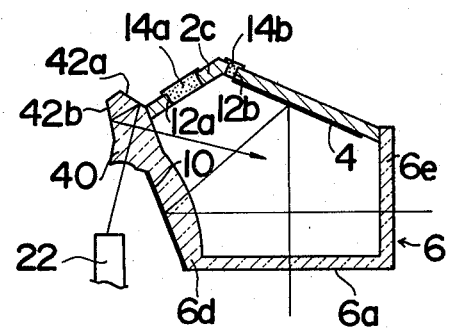

In the embodiment of FIG. 6, pieces of MOLTOPREN 14a and 14b are fitted into apertures 12a and 12b provided in front wall 2c of upper roof portion 2 and in a position out of any effective reflection region on the ridge of upper roof portion 2. In this embodiment, the light from ring 22 passes through a concave lens portion 40 provided integrally with front wall 6d of lower roof support 6, is reflected on reflecting surfaces 42a and 42b, and then enters the roof reflecting mirror assembly. Third reflecting mirror 10 is a plane mirror, and forms a convex mirror lens in combination with the front wall of roof support 6.

Figure 7:
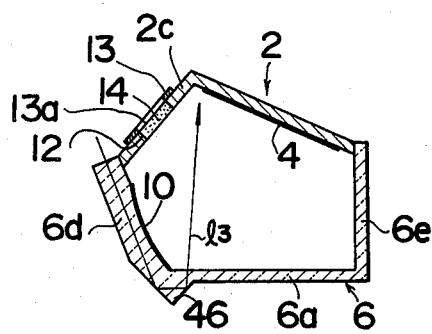
Figure 8:
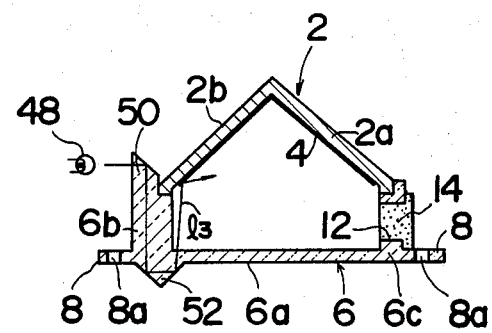
Figure 9:
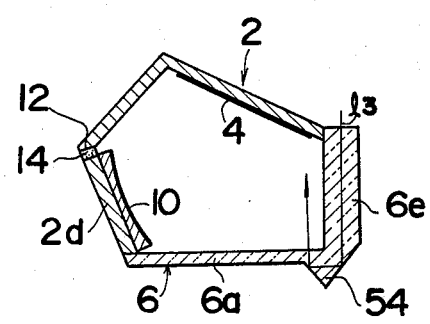

In the embodiments shown in FIGS. 7 through 9, a display optical system for displaying photographic information provided in the camera body is formed integrally with the lower roof support. A line 13 represents the optical path of the information display light.

In the embodiment of FIG. 7, MOLTOPREN 14 is fitted into an aperture 12 provided in front wall 2c of upper roof portion 2. The MOLTOPREN is attached to a plate 13 having an opening 13a. In the optical system of this embodiment, the light from an information source (not shown) passes through front wall 6d serving as a light guide, then is reflected twice on a prism 46 formed integrally with the lower end of the front wall and the front portion of bottom wall 6a, and enters the roof reflecting mirror assembly.

In the embodiment of FIG. 8, aperture 12 is provided in side wall 6c of lower roof support 6 and is fitted with MOLTOPREN 14. The optical system is so arranged that the light from a lamp 48 serving as an information source enters side wall 6b serving as a light guide, then is reflected three times on prism portions 50 and 52 in the manner shown in the drawing, and emits from bottom wall 6a into the roof reflecting mirror assembly.

In the embodiment of FIG. 9, aperture 12 is filled with MOLTOPREN in a portion of front wall 2d which is out of the effective reflection region thereof. The front wall is integral with upper roof portion 2. The light from an information source (not shown) enters rear wall 6e serving as a light guide, then is reflected twice on prism 54 which is formed integrally with the lower end of rear wall 6a and the rear end of bottom wall 6a, and thereafter enters the roof reflecting mirror assembly. Third reflecting mirror 10 is formed separately and attached to front wall 2d extending integrally from upper roof portion 2.

Figure 10:
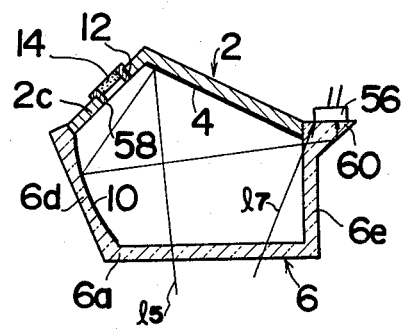
Figure 11:
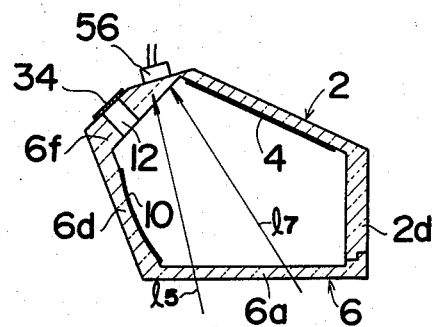

In the embodiments shown in FIGS. 10 and 11, a light measuring optical system for introducing light from an object into a light receiving element 56 for measurement of light is formed integrally with lower roof support 6.

In the embodiment of FIG. 10, a frame 58 has MOLTOPREN 14 fitted into an aperture 12 provided in front wall 2c of upper roof portion 2. The flux of light 15 from the front of a focusing plate (not shown) is reflected on reflecting mirrors 4 and 10, to enter a prism 60, then is reflected on the reflecting surface formed at the rear of prism 60, and enters light receiving element 56. A light flux 17 from the rear of the focusing plate passes through the pentagonal roof reflecting mirror assembly to directly enter into prism 60 and eventually into light receiving element 56. In this embodiment, prism 60 serves as a holder for light receiving element 56.

In the embodiment of FIG. 11, lower roof support member 6 includes bottom wall 6a, the left and right side walls (not shown), front wall 6d supporting third reflecting mirror 10, and a front upper wall 6f joined to the roof wall of upper portion 2. Light receiving element 56 is disposed on front upper wall 6f. Front upper wall 6f serves as a light guide for introducing light flux 15 from the front of the focusing plate as well as light flux from the rear thereof into light receiving element 56. Aperture 12 is provided, out of the optical path of the viewfinder light, in front upper wall 6f, and is covered with a piece of cloth 34. In this embodiment, upper roof portion 2 has a rear wall 2d serving as a viewfinder light emitting portion and is made of transparent plastic material. Lower roof support 6 is also made of a transparent plastic material.

Figure 12:
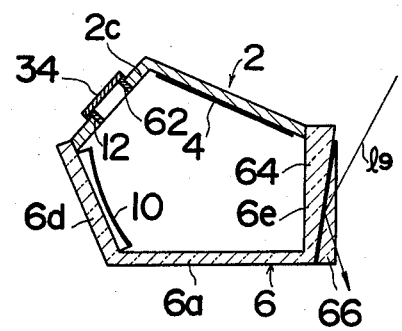

In the embodiment shown in FIG. 12, a frame 62 having a piece of cloth 34 attached thereto is fitted into aperture 12, provided in front wall 2c of upper roof portion 2. Prism 64 forms the rear wall 6e. A wedge-shaped prism 66 is placed at a position spaced from prism 64. An inversely incident, oblique light 19 from above the ocular lens (not shown) is totally reflected on the slope of prism 64 to thereby be directed downward, rather than enter the roof reflecting mirror assembly. In each of the embodiments of FIG. 7 and FIGS. 9 through 12, the third reflecting mirror 10 is a concave reflecting mirror.

Figure 13:
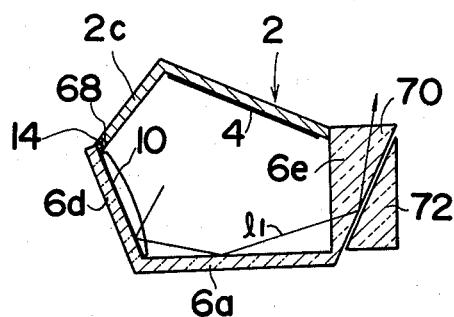
Figure 14:
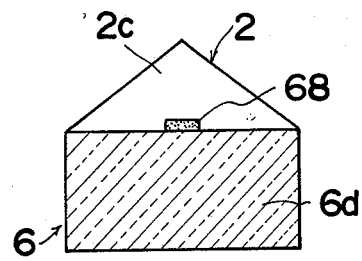
FIG. 14 is a front elevational view of the modified embodiment shown in FIG. 3.

In the embodiment of FIGS. 13 and 14, an elongated cut 68 is provided in the front end of upper roof portion 2, and firmly holds therein MOLTOPREN 14, in cooperation with the top end of front wall 6d of lower roof support 6. In this embodiment, the air-permeative shielding member may be fitted into a portion in which the two members forming the closed casing are joined to each other. The opposing slopes of prisms 70 and 72 are somewhat sharp in their angle of inclination, and a ghost light 111 is totally reflected on the slope of prism 70 in an upward direction.

Figure 15:
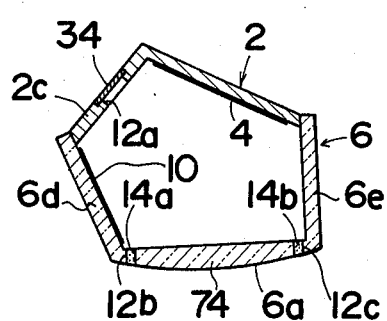
Figure 16:
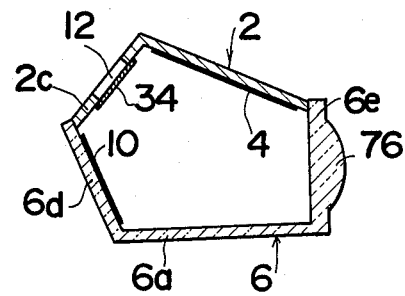
Figure 17:
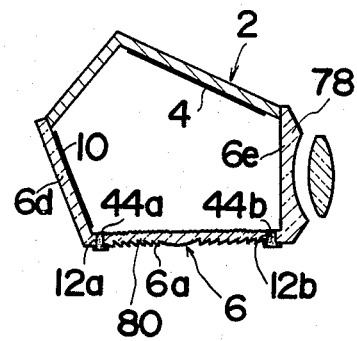

In FIGS. 15 through 17, at least one optical element of the viewfinder optical system is formed integrally with the lower roof support member 6.

In the embodiment of FIG. 15, cloth 34 is attached to front wall 2c of upper roof portion 2 in such a manner to cover an aperture 12a provided in the front wall, and MOLTOPREN material 14a and 14b is positioned in apertures 12b and 12c provided in bottom wall 6a of lower roof support 6, which portion is out of the optical path of the viewfinder light. In this optical system, a condenser lens 74 is formed integrally with bottom wall 6a of lower roof support 6.

In the embodiment of FIG. 16, cloth 34 is attached to the inner wall of front wall 2c of upper roof portion 2 in a manner to cover aperture 12 provided in the front wall thereof. A singular element ocular lens 76 is formed integrally with rear wall 6e of lower roof support 6.

In the embodiment of FIG. 17, pieces of paper 44a and 44b are fitted into apertures 12a and 12b which are provided in the opposite end portions of bottom wall 6a of lower roof support 6, respectively. A front lens 78 of a two-element ocular lens is formed integrally with rear wall 6e of lower roof support 6, and the focusing plate is formed integrally with bottom wall 6a.

According to the arrangements so far described, the pentagonal roof reflecting mirror assembly is in the form of a closed casing consisting of the upper roof portion, the transparent lower roof support and the air-permeative light-shielding member. The shielding member or members do not admit dust, but do allow permeation of air into the assembly owing to the air-permeative shielding member, thereby providing freedom of condensation of moisture within the assembly due to any fluctuation in temperature.

The above-described air-permeative shielding member may be MOLTOPREN, paper, a thin sheet of foamed styrole or cloth so far as such material is dust proof and air-permeative. The air-permeative shielding member may also be subjected to a light-shielding treatment. The portions in which the air-permeative shielding member are to be fitted should be provided out of the effective reflection region of the wall portions of the casing and out of the optical path of the viewfinder light.

As is obvious from the embodiments shown, the casing is preferably formed by fitting upper roof portion 2 and lower roof support 6 into each other, so that adjustment of the relative position of one reflecting mirror 4 to the other reflecting mirror 10 is not needed. However, upper roof portion 2 and lower roof portion 6 need not always be fitted into each other, and may be joined in an abutting manner. In the latter case, these two members will be bonded to each other. The roof-shaped reflecting mirror and the third reflecting mirror may be integrally supported by the roof portion. It is recommended that the wall portions of the lower roof support, which are out of the optical paths of respective optical systems, be subjected to a light-shielding treatment, so that introduction of unwanted light into the assembly is prevented. For the closed casing formed by the upper roof portion and the transparent lower roof support, the lower roof support and the optical element of an additional optical system or an optical element of the viewfinder optical system may be formed integrally with each other, with a resulting ease of manufacture of the additional optical system of the viewfinder optical system, as well as omission of holding members for respective optical elements.

FIGS. 18 through 22 show embodiments in which the pentagonal roof reflecting mirror assembly of a closed casing includes a frame member made of a plastic material and having on the inner wall thereof, first and second roof-shaped reflecting mirrors, a third reflecting mirror opposing the reflecting surfaces of the aforesaid roof-shaped reflecting mirrors, and optical elements fitted into the frame member.

Figure 18:
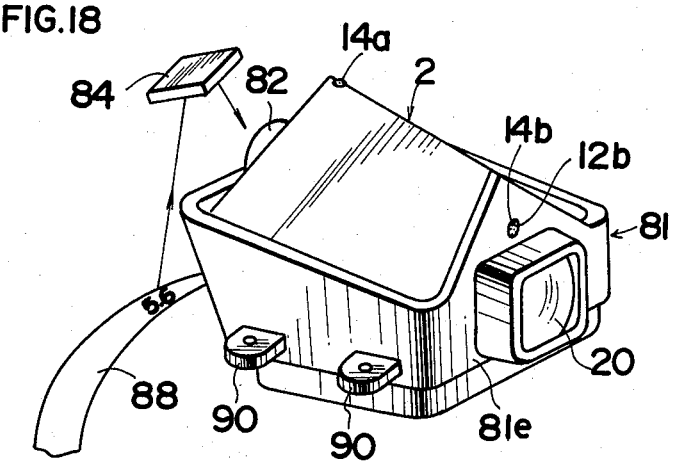
FIG. 18 is a perspective view of another basic embodiment of the present invention.
Figure 19:
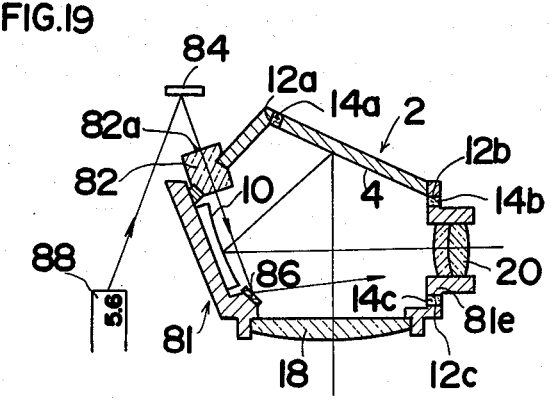
FIG. 19 is a cross-sectional view of the embodiment shown in FIG. 18.

In the embodiment of FIGS. 18 and 19, the frame body is constituted by an upper roof portion 2 on a lower roof support 81. First and second reflecting mirrors 4 are supported on the inner roof surface of upper roof portion 2, and a third concave reflecting mirror 10 is attached in an opposed relation to reflecting mirrors 4 to the inner front wall of lower roof support 81. A transparent block 82 having a concave surface 82a is fitted into the top front wall of upper roof portion 2. Transparent block 82 constitutes an optical system for displaying within the viewfinder diaphragm values inscribed on a diaphragm setting ring 88 on a lens barrel, in combination with a reflecting mirror 84 disposed above the transparent block and a reflecting mirror 86 attached to the inner lower end of the front wall of lower roof support 81. Condenser lens 18 for collecting diffused light emitted from the focusing plate (not shown) and viewfinder ocular lens 20 are fitted into the bottom wall and the rear wall of lower roof support 81. Pieces of MOLTOPREN 14a, 14b, 14c are positioned in apertures 12a, 12b and 12c which are provided in the ridge portion of upper roof portion 2, out of the effective reflection region, and in rear wall 81e of the top and bottom end portions of lower roof support 81, respectively. The pentagonal roof reflecting mirror assembly thus presents a box shape, closed by the outer casing, consisting of upper roof portion 2 and lower roof support 81, transparent block 82, condenser lens 18, ocular lens 20 and MOLTOPREN 14. Lugs 90 for attaching the pentagonal roof reflecting mirror assembly to the camera body (not shown) are formed integrally with lower roof support 81. Upper roof portion 2 and lower roof support 81 are preferably made of an opaque material, in order to prevent introduction of unwanted light into the casing.

Figure 20:
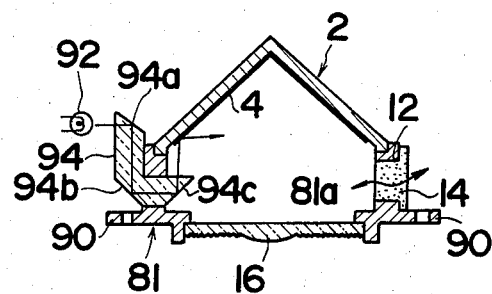
FIGS. 20 to 22 are cross-sectional views of various modifications of the embodiment shown in FIGS. 18 and 19.

In the embodiment shown in FIG. 20, a light guide 94 for introducing light, from a light-emitting diode 92 into the casing, is fitted into a side wall of lower roof support 81, and a Fresnel focusing plate 16 is fitted into the bottom wall of lower roof support 81. Light emitting diode 92 can be lit to indicate exposure parameters. The light from the light-emitting diode is reflected in succession on the reflecting surfaces 94a, 94b and 94c formed on a light guide 94, and thereafter enters the pentagonal roof-shaped reflecting mirror assembly. Aperture 12 is provided in a side wall 81a of lower roof support 81. MOLTOPREN 14 is fitted into aperture 12.

Figure 21:
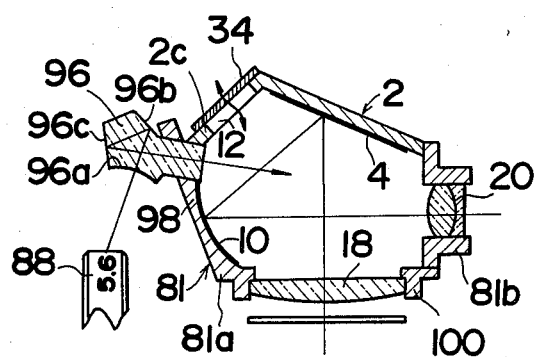

In the embodiment of FIG. 21, a transparent block 96 is fitted into the front wall of lower roof support 81, the transparent block has a light incident concave surface 96a, and reflecting surfaces 96b and 96c. The light from diaphragm setting ring 88 passes through light incident surface 96a, then is reflected on reflecting surfaces 96b and 96c, and enters the roof reflecting mirror assembly to be directed to ocular lens 20. Third reflecting mirror 10 being of a concave shape is formed on a front wall of lower roof support 81. Lower roof support 81 consists of a portion 81a which forms a front wall 98 and bottom wall 100 and a portion which forms rear wall 81b, and which is separate from portion 81a. In this manner, the roof portion and/or the lower roof support may be formed of more than two members, respectively. Aperture 12 is provided in front wall 2c of upper roof portion 2. Cloth 34 is attached to the front wall in a manner to cover the aperture 12.

Figure 22:
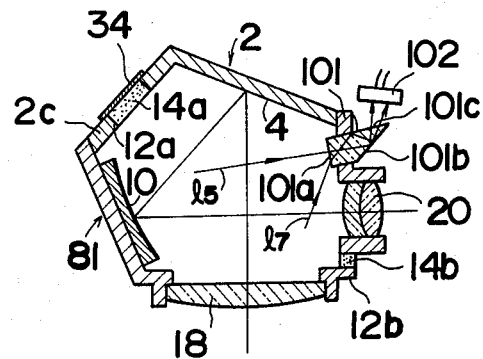

In the embodiment of FIG. 22, one aperture 12a is provided in front wall 2c of upper roof portion 2, and MOLTOPREN 14a to which cloth 34 is attached, is fitted into the aperture. Another aperture 12b is provided in the lower portion of the rear wall of lower roof support 81, and MOLTOPREN 14 is fitted into the aperture 12a. In this optical system, a transparent block 101 having a light-incident surface 101a, a reflecting surface 101b, and a light-emitting surface 101c is fitted into the top portion of the rear wall of lower roof support 81. The light from the rear of the focusing plate (not shown) passes through light incident surface 101a, is totally reflected on light-emitting surface 101c, and then on light reflecting surface 101b, and emits from light-emitting surface 101c into light receiving element 102. The light 15 from the front of the focusing plate is reflected on first and second roof-shaped reflecting mirrors 4, on third concave reflecting surface 10, and passes through light-incident surface 101a to be reflected on reflecting surface 101b, and finally emits from the light-emitting surface 101c into light receiving element 102.

In each of the embodiments shown in FIGS. 18 to 22, the pentagonal roof reflecting mirror assembly is in the form of a casing closed by the upper roof portion, the lower roof support, the air-permeative shielding members and optical elements fitted into the lower roof support. By such arrangement, admission of dust into the reflecting mirror assembly is prevented, and the passing of a desired amount of air through the air-permeative shielding members is ensured.

Where the lower roof support is made of plastic having a light-shielding ability as in the embodiments shown in FIGS. 18 to 22, a special light-shielding treatment need not be applied thereto, in order to prevent introduction of unwanted light into the casing.

As can be readily appreciated, the various features of each of the individual embodiments may be recombined into other configurations to provide each of their respective advantages. Persons skilled in this field are accordingly capable of modifying the present invention within its generic teachings. Accordingly, the scope of the present invention should be measured solely from the following claims, wherein we claim:

What is claimed is:

1. An improved pentagonal lightweight roof type reflecting mirror assembly, for mounting on a camera, free of dust and debris on its reflecting surfaces and not subject to condensation by trapped water vapor, comprising:

a hollow, substantially airtight, plastic body member having a plurality of internal reflecting surfaces, at least one side of the body member capable of transmitting an image for internal reflection while an adjacent second side is capable of transmitting the image from the interior of the body member to a viewer, a third side of the body member is approximately diagonally juxtaposed across from the common edge of the first and second side and includes an aperture positioned outside the optical axis and extending therethrough, and a sealing member including a ventilative foamed plastic member fixed in and extending across the aperture, the sealing member being opaque to the transmission of light onto the reflective surfaces, while transmitting water vapor.

2. The invention of claim 1 wherein the foamed plastic member is a polyurethane resin foam having air pores sufficiently small to pass water vapor while trapping dust.

3. The invention of claim 2 wherein the sealing member includes a cloth member.

4. The invention of claim 2 wherein the sealing member includes a paper member.

5. An improved lightweight roof type reflecting mirror assembly for mounting on a camera, for use in a viewfinder optical system that is free of dust and debris on its internal reflecting mirror surfaces and further not subject to any condensation by trapped water vapor, comprising:

a hollow, substantially airtight, plastic body member including a lower front wall having an inside surface on which a front reflective mirror is formed, a light exit wall for emitting the viewfinder light fluxes, a pair of side walls and a roof having inside roof faces on which a pair of roof reflective mirrors are formed respectively and an upper front roof support connected to and extending above the lower front wall, the upper front roof support including a first aperture, the light exit wall including a second aperture and at least one of the lower front wall and the light exit wall including a third aperture;

a sealing member, including a ventilative foamed plastic member having air pores sufficiently small to pass water vapor while trapping dust and a thin opaque porous member, fixedly extends across the first aperture;

an ocular lens assembly is operatively positioned in the second aperture, and a transparent internally reflecting member is operatively positioned in the third aperture to convey at least information relative to one of an object scene and camera settings through the viewfinder optical system.

6. The invention of claim 5 wherein the foamed plastic member is a polyurethane resin.

7. The invention of claim 6 wherein the opaque porous member is cloth.

8. The invention of claim 6 wherein the opaque porous member is paper.

9. The invention of claim 6 wherein a plurality of internally reflecting facets are provided on the reflecting member.

10. The invention of claim 9 wherein the reflecting member has a light incident concave surface.

* * * * *